United States Patent
Park et al.

(10) Patent No.: US 10,497,390 B1
(45) Date of Patent: Dec. 3, 2019

(54) DECISION-FREE TIMING DISTURBANCE CANCELLATION CAUSED BY HAMR LASER POWER VARIATION

(71) Applicant: Marvell International Ltd., Hamilton (BM)

(72) Inventors: Jongseung Park, Mountain View, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/263,845

(22) Filed: Jan. 31, 2019

Related U.S. Application Data

(60) Provisional application No. 62/736,917, filed on Sep. 26, 2018.

(51) Int. Cl.
  *G11B 20/10* (2006.01)
  *G11B 11/105* (2006.01)
  *G11B 20/18* (2006.01)

(52) U.S. Cl.
  CPC .... *G11B 11/10547* (2013.01); *G11B 20/1816* (2013.01)

(58) Field of Classification Search
  CPC ..... G11B 5/00; G11B 20/10009; G11B 27/36; G11B 5/09; G11B 20/10; G11B 20/1419; G11B 5/02; G11B 20/10213; G11B 20/18; G11B 20/10046
  USPC ........................................................ 360/65
  See application file for complete search history.

(56) References Cited

U.S. PATENT DOCUMENTS 9,934,814 B2 * 4/2018 Tang ................ G11B 20/10037

\* cited by examiner

*Primary Examiner* — Nabil Z Hindi

(57) ABSTRACT

Embodiments described herein provide methods and systems for correcting a transient phase error induced while recording on a magnetic recording medium. An input signal is received and is distributed to a plurality of sinc filters. A respective phase-shifted signal is generated at each of the plurality of sinc filters by adding a corresponding predetermined amount of phase to the received signals. A respective score is assigned to each of the generated phase-shifted signals. The generated phase-shifted signal having the highest score is selected as the phase-corrected signal to compensate for the transient phase error induced while recording on the magnetic recording medium.

20 Claims, 9 Drawing Sheets

DECISION-FREE TIMING DISTURBANCE CANCELLATION CAUSED BY HAMR LASER POWER VARIATION

CROSS REFERENCE TO RELATED APPLICATION

This claims the benefit of commonly-assigned U.S. Provisional Patent Application No. 62/736,917, filed Sep. 26, 2018, which is hereby incorporated by reference herein in its entirety.

FIELD OF USE

This disclosure generally relates to heat-assisted magnetic recording (HAMR), also referred to as energy-assisted magnetic recording (EAMR), thermally-assisted magnetic recording (TAMR), and thermally-assisted recording (TAR). More particularly, this disclosure relates to compensating for a phase shift induced by laser power variation during writing of a waveform to a magnetic recording medium using a HAMR apparatus comprising a laser.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

HAMR technology uses a laser source and a near-field transducer to heat a small spot on a magnetic disk during the recording. The heat lowers magnetic coercivity at the spot, allowing a write transducer to change the orientation of the magnetic domain at the spot. Due to the relatively high coercivity of the medium after cooling, the data is less susceptible to paramagnetic effects that lead to data errors. In general, HAMR uses laser to heat magnetic media during recording. Stability of the laser power is important for recording performance since write width, magnetic transition location, and effective write field gradient highly depends on laser power. However, laser power stability is very challenging for HAMR due to a number of factors such as space limitations, high power density, and large environmental temperature variations.

SUMMARY

Embodiments described herein provide methods and systems for correcting a transient phase error induced while recording on a magnetic recording medium. An input signal is received and is distributed to a plurality of sinc filters. A respective phase-shifted signal is generated at each of the plurality of sinc filters by adding a corresponding predetermined amount of phase to the received signals. A respective score is assigned to each of the generated phase-shifted signals. The generated phase-shifted signal having the highest score is selected as the phase-corrected signal to compensate for the transient phase error induced while recording on the magnetic recording medium.

In some embodiments, the respective score is assigned to each of the generated phase-shifted signals by computing, for each of the phase-shifted signals generated by the corresponding filter, a respective path metric and assigning the respective score to each of the generated phase-shifted signals based on the corresponding computed path metrics.

In some embodiments, computing of the respective path metrics includes computing, using a trellis structure and a Viterbi algorithm, a distance between the generated phase-shifted signals output from the corresponding filter and all possible signals on the trellis structure.

In some embodiments, selecting the generated phase-shifted signal having the highest score as the phase-corrected signal includes selecting, using a multiplexer, the generated phase-shifted signal corresponding to a minimum path metric from the plurality of computed path metrics as the phase-corrected signal.

In some embodiments, the plurality of filters includes a first filter, a second filter, and a third filter. The first filter is configured to shift the phase of the received signal by a predetermined amount in a first direction. The second filter is configured to shift the phase of the received signal by the predetermined amount in a second direction opposite to the first direction. The third filter is configured to maintain the phase of the received signal.

In some embodiments, the method further includes computing, using a trellis structure, a respective path metric for each of the generated phase-shifted signal.

In some embodiments, the method further includes selecting one of the first direction or the second direction based on the identified phase-adjusted signal corresponding to the minimum distance metric. The amount of shift in the phase of the received signal is cyclically incremented in the selected direction in each of the first, the second, and the third filters.

In some embodiments, a path metric is computed for each of the phase-shifted signal generated by the first, the second, and the third filter. A phase-shifted signal corresponding to a minimum path metric from the plurality of computed path metrics is selected as the phase-corrected signal.

In some embodiments, the phase-corrected signal is recorded on the magnetic recording medium using a heat-assisted magnetic recording (HAMR) apparatus, the HAMR apparatus being configured to apply heat to a spot on the magnetic recording medium via a laser.

In some embodiments, the transient phase error is induced by a laser power variation during a write operation.

In some embodiments, an apparatus for compensating for a transient phase error induced while recording on a magnetic recording medium is provided. The apparatus includes control circuitry configured to receive an input signal and distribute the input signal to a plurality of filters. A plurality of filters is configured to receive the input signal from the control circuitry and generate a respective phase-shifted signal by adding a corresponding predetermined amount of phase to the received signal. A phase detector assigns a respective score to each of the generated phase-shifted signals. A multiplexer (MUX) selects the generated phase-shifted signal having the highest score as the phase-corrected signal to compensate for the transient phase error induced while recording on the magnetic recording medium.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
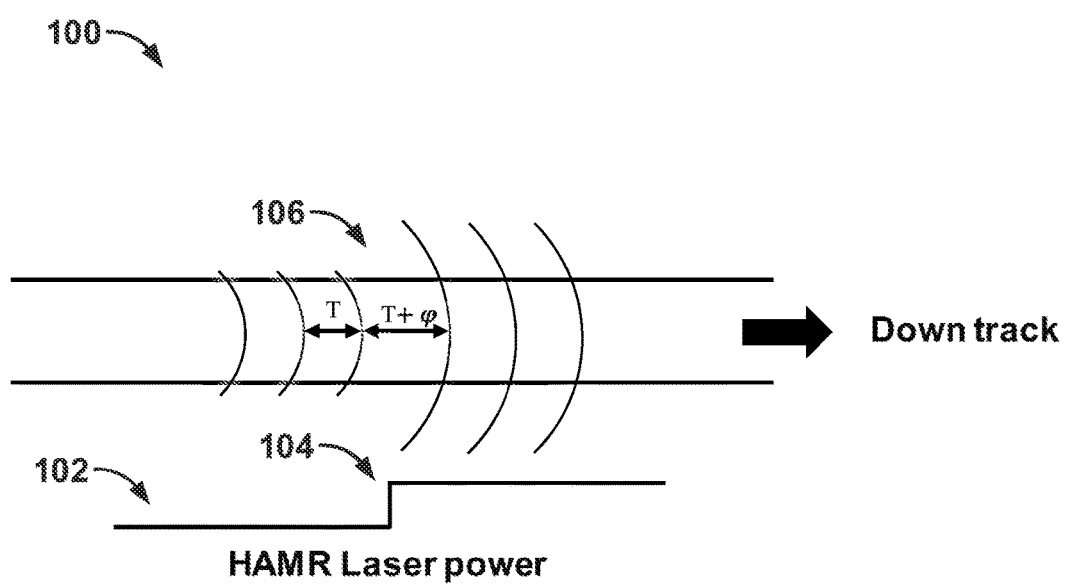
FIG. 1 illustrates a waveform associated with a laser power variation that can occur in a Heat-Assisted Magnetic Recording drive.

This discussion describes methods and systems for compensating for a phase shift induced because of a laser power variation while writing on a magnetic recording medium using Heat-Assisted Magnetic Recording (HAMR) techniques. Conventional recording techniques (e.g., perpendicular magnetic recording or PMR) modify the magnetization of the magnetic recording medium by changing the direction of the magnetic grains, which represent bits. Specifically, the position of the transition on the magnetic disk is defined by the magnetic field coming from the writer. That is, the polarity of the magnetic field coming from the writer flips the magnetic grains on the recording medium. The flip of the magnetic grains causes a transition boundary on the recording medium (i.e., an edge between magnetic grains representing a bit "0" and a bit "1"). In conventional non-HAMR systems, this transition boundary is defined by the write field (also known as a write bubble).

In HAMR, additional heat needs to be provided to flip the magnetic grain on the recording medium to write the data. The additional source of heat is provided using laser power to heat a spot on the recording medium. The heat from the laser softens the recording medium such that the amount of field provided by the writer is sufficient to flip the magnetic grain during the writing phase. When the laser is no longer applied to the spot, the spot on the recording medium cools down. Once the temperature at the spot of the recording medium is sufficiently lowered, the magnetization of the grains at the spot can no longer be changed. However, during laser power fluctuations, the spot gets more heat than needed which also causes the recording medium to take longer to cool down. This results in a transition shift (also called a phase shift) due to the excess heat being applied at the spot on the recording medium.

This discussion describes methods and systems for compensating for the phase shift induced because of the laser power variations during the writing phase. A channel response of a sequence of transmitted bits to be written on to the magnetic recording medium (e.g., {0,1,0,1,1,0}) is equalized. The resulting received signal is distributed to a bank of sinc filters where each filter is configured to generate a respective phase-shifted version of the received signal. For example, the system may include 40 filters with each filter being configured to add an additional 9° of phase-shift such that the received signal is phase-shifted by a full 360°. The system then computes a respective path metric (e.g., using a Trellis) for each of the generated phase-shifted signals by comparing each of the generated phase-shifted signals to all possible signals. In various embodiments discussed below, known techniques such as a Viterbi algorithm are used to perform the comparison. However, any known method of comparing all possible signals to the phase-shifted signal output by the bank of filters may be used to identify a match.

A selector is configured to select one of the phase-shifted signals output by one of the filters from the bank of sinc filters based on their respective computed path metric. For example, in an embodiment where there is a transient phase shift of −36° induced due to a spike in the laser power, the selector determines the phase-shifted signal generated by the fourth filter of the bank of sinc filters (where each filter adjusts the phase of the received signal in multiples of 9°) to be the appropriate phase-corrected signal which compensates for the transient phase defect induced due to laser power variation.

FIG. 1 illustrates a waveform associated with a laser power variation that can occur in a HAMR drive 100. At the bottom of FIG. 1, a HAMR laser power curve 102 is illustrated. The HAMR laser power curve 102 is relatively constant at a first power level during an initial portion of a write operation. At a time 104, an abrupt change in laser power is experienced, resulting in a change from the first power level to a second power level that is higher than the first power level. The abrupt step-change in the HAMR laser power curve 102 results in a shift in the location and timing of written transitions, and a corresponding change 106 in the phase waveform. Specifically, as illustrated above the HAMR laser power curve 102 in FIG. 1, the phase waveform is shifted by a value φ representative of a transition shift.

Figure 2A:
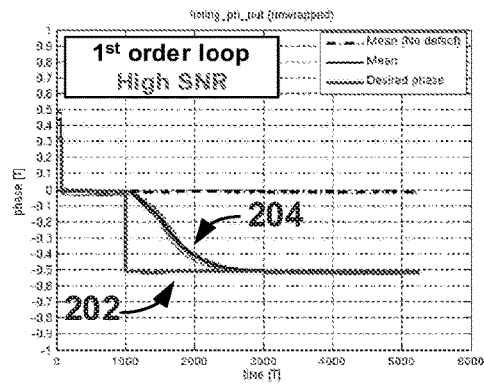
FIGS. 2a-2d graphically illustrate several waveforms associated with a HAMR laser power variation.
Figure 2B:
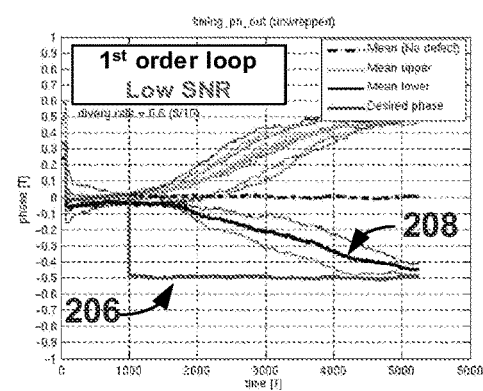

FIGS. 2A-2D graphically illustrate several waveforms associated with a HAMR laser power variation. Specifically, a phase defect of −0.5 T is injected into the timing loop at 1000 T. As illustrated in FIG. 2(a), the curve 202 indicates the phase change caused by the HAMR laser power variation while the curve 204 indicates the output of a conventional detection algorithm. As further shown in FIG. 2(a), when the channel signal-to-noise ratio (SNR) is high, the output of the conventional detection algorithm takes approximately 2500 T to track the desired phase. FIG. 2(b) shows an instance where the SNR is low and the conventional detection algorithm output curve 208 diverges away from the curve 206 (which follows the phase jump due to HAMR laser power variation). As illustrated in FIG. 2(b), the output of the conventional detection algorithm (curve 208) takes significantly longer to match the desired phase (approximately 5000 T or more).

Figure 2C:
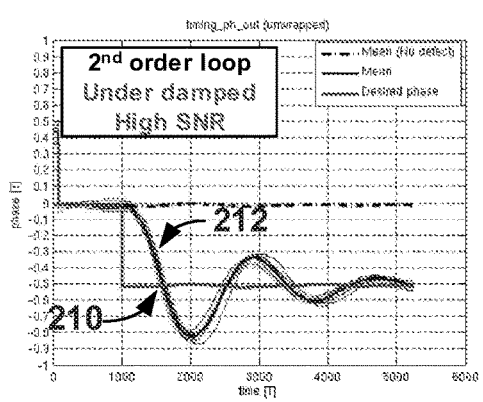

The system performance of conventional detection algorithms is further degraded when using a second order loop as illustrated in FIGS. 2(c) and (d). As illustrated in FIG. 2(c), the curve 210 indicates the phase change caused by the HAMR laser power variation while the curve 212 indicates the output of a conventional detection algorithm. As further shown in FIG. 2(c), when the channel signal-to-noise ratio (SNR) is high, the output of the conventional detection algorithm takes approximately 5000 T to stabilize the desired phase after oscillating around the desired phase.

Figure 2D:
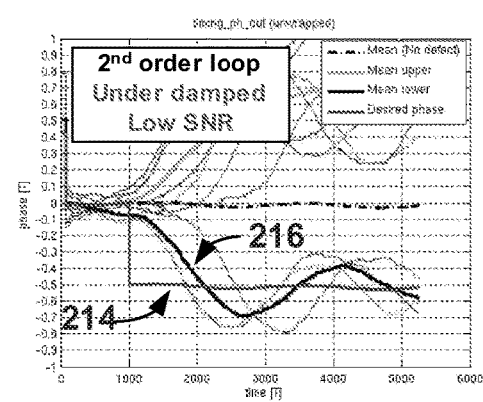

FIG. 2(d) shows an instance where the SNR is low and the conventional detection algorithm output curve 216 diverges away from the curve 214 (which follows the phase jump due to HAMR laser power variation). As illustrated in FIG. 2(d), the output of the conventional detection algorithm (curve 216) continues to oscillate around the desired phase.

Figure 3:
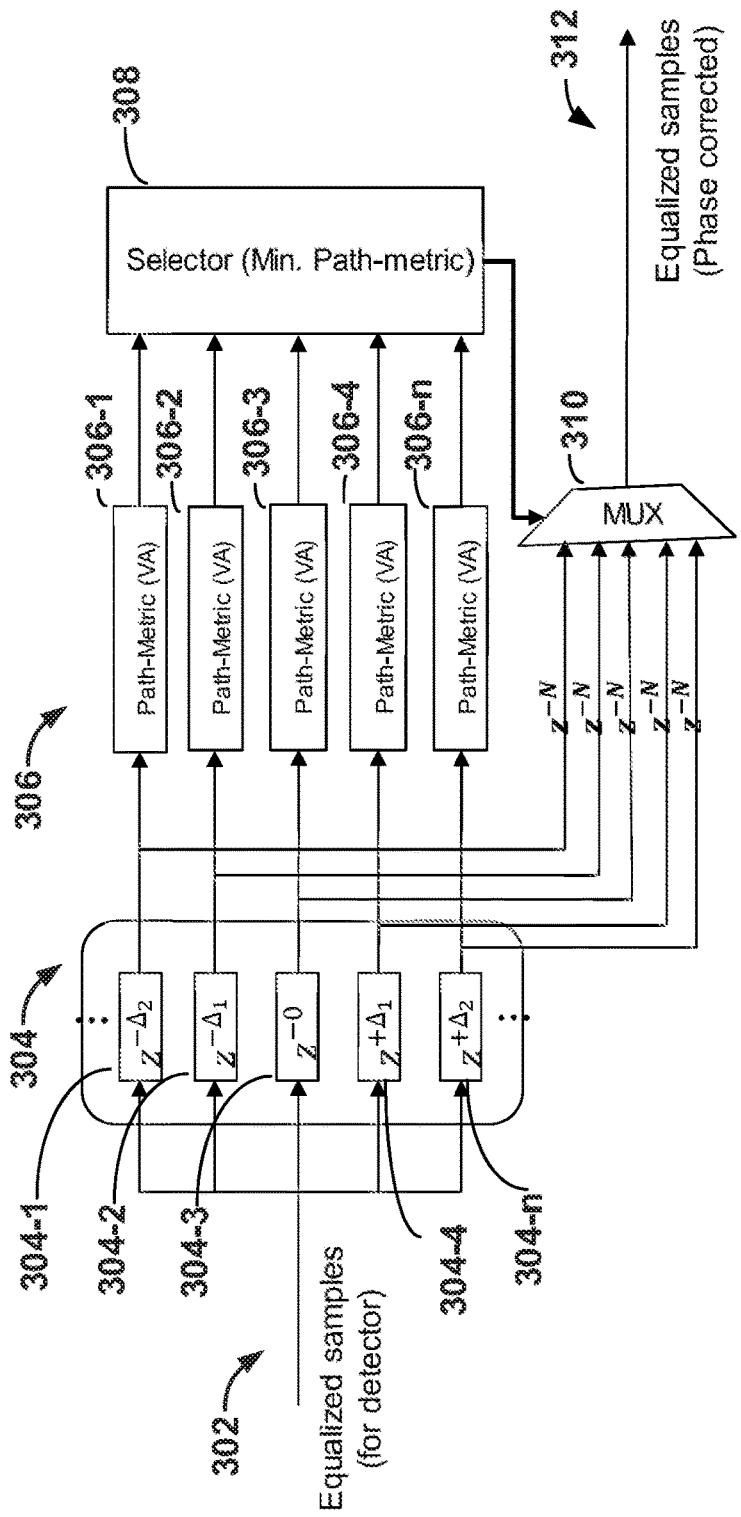
FIG. 3 depicts a high-level system diagram of an apparatus for compensating for a transient phase error induced while recording on a magnetic recording medium.

FIG. 3 depicts a high-level system diagram of an apparatus for compensating for a transient phase error induced while recording on a magnetic recording medium. As shown in FIG. 3, equalized samples of the input signal 302 are distributed to a bank of filters 304-1, 304-2, 304-3, 304-4 . . . 304-N (collectively sinc filters 304). The sinc filters 304 are configured to each adjust the phase of the equalized samples of the input signal 302. In one example where sinc filters 304 includes a total of 40 filters, each filter is configured to incrementally add 9° of phase to the received signal. That is filter 304-3 does not shift the phase of the received signal, filter 304-2 shifts the phase of the received signal by −9°, and filter 304-1 shifts the phase of the received signal by −18°. Similarly, filter 304-4 shifts the phase of the received signal by +9° and so on.

Each of the filters in the sinc filters 304 output a respective phase-shifted signal. A corresponding path metric calculation block 306-1, 306-2, 306-3, 306-4, and 306-n (collectively path metric calculation block 306) computes a respective path metric for each of the generated phase-shifted signals. In an embodiment, the path metric calculation block 306 calculates path metrics for each of the sinc filters 304 on a trellis structure of a Viterbi Algorithm. However, a person skilled in the art will appreciate that any number of known techniques may be used at the path metric calculation block 306 to calculate the respective path metrics. A selector 308 in conjunction with the MUX 310 selects the phase-shifted signal that has the minimum path metric. Operation of the path metric computation is discussed in more details with reference to FIG. 4. Finally, the MUX 310 outputs the phase-corrected signal 312 that selected by the selector 308/MUX 310 pair.

Figure 4:
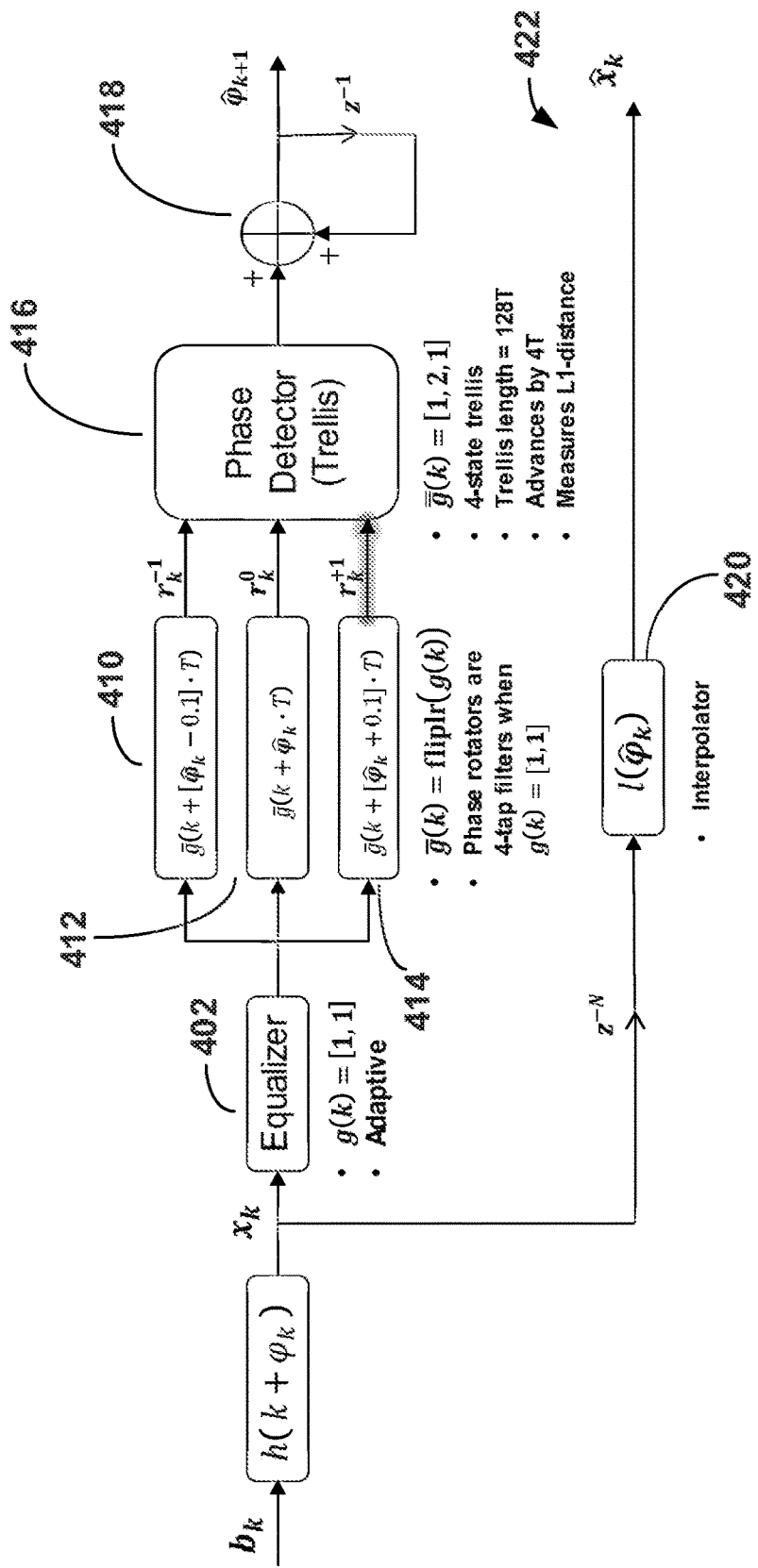
FIG. 4 depicts a simplified implementation of the apparatus described in FIG. 3 using three phase rotators.

As will be evident from the discussion above, to obtain an accurate phase-corrected signal 312 that best matches the transient phase error induced due to laser power variation, a large number of sinc filters 304 are required. FIG. 4 depicts a simplified implementation of the apparatus described in FIG. 3 using three phase rotators (i.e., the three phase rotators perform the same operations as the sinc filters 304 by adjusting the phase of the received signal). As illustrated in FIG. 4, transmitted bits $b_k$ (e.g., 0, 1, 1, 0, 1, 0, 1, 0) are to be recorded on to the magnetic recording medium. The channel impulse response h(k) includes a phase error $\varphi_k$ such that the channel output $x_k$ (i.e., the received signal) can be expressed as $h(k+\varphi_k)$. In an embodiment, the received signal $x_k$ can be either Analog-to-Digital Converter (ADC) samples or equalized samples. An equalizer 402, the target of which is g(k)=[1,1], equalizes the received signal $x_k$. That is, if the received signal is equalized perfectly by the equalizer 402, the equalizer output would be a convolution of the transmitted bits $b_k$ and [1, 1].

An output of the equalizer 402 is distributed to three phase rotators 410, 412, and 414. As shown in FIG. 4, $\bar{g}(k)$ is a matched filter of g(k) such that when g(k)=[1,1], $\bar{g}(k)$ is also equal to [1,1]. In the example shown in FIG. 4, the first phase rotator 410 represented by $\bar{g}(k+[\hat{\varphi}_k-0.1]\cdot T)$ is designed to inject a phase shift of −0.1 T into the equalized sample of the equalizer 402 and output a phase-shifted signal $r_k^{-1}$. Similarly, the third phase rotator 414 represented by $\bar{g}(k+[\hat{\varphi}_k+0.1]\cdot T)$ is designed to inject a phase shift of +0.1 T into the equalized sample of the equalizer 402 and output a phase-shifted signal $r_k^{+1}$. Finally, the second phase rotator 412 represented by $\bar{g}(k+[\hat{\varphi}_k]\cdot T)$ is configured to generate a signal $r_k^0$. That is, the first phase rotator 410 is configured to shift the phase of the equalized sample in a first direction (i.e., −0.1 T) and the third phase rotator 414 is configured to shift the phase of the equalized sample in a second direction (i.e., +0.1 T) opposite of the first direction.

The phase-shifted signals $r_k^{-1}$, $r_k^0$, and $r_k^{+1}$ are subsequently compared to all possible signals using a phase detector 416 configured to employ a trellis structure. Specifically, the phase detector 416 sets a target $\bar{g}(k)$ to be equal to $g(k)*\bar{g}(k)=[1,2,1]$ when g(k)=[1,1] (where "*" is the convolution operation. That is, the phase detector 416 is configured to compute a branch metric representing a distance between each of the phase-shifted signals $r_k^{-1}$, $r_k^0$, and $r_k^{+1}$ and the a target path ($\bar{g}(k)$) on the trellis. Although FIG. 4 states that a L1 distance (i.e., an absolute distance) is computed, a person skilled in the art will appreciate that any number of distance metrics may be computed (e.g., measurement of an L2 distance or a statistical distance with noise variance).

In response to determining that at least one of the phase-shifted signals $r_k^{-1}$, $r_k^0$, and $r_k^{+1}$ matches any of all possible signals on the trellis such that $\bar{g}(k)=g(k)*\bar{g}(k)=[1,2,1]$ when g(k)=[1,1] based on the trellis structure (i.e., the corresponding L1 distance is 0), the system determines the corresponding phase $\hat{\varphi}_k$ by which the received signal was adjusted to be equal to the phase correction required. However, in an example where none of the phase-shifted signals $r_k^{-1}$, $r_k^0$, and $r_k^{+1}$ is an exact match to any of all possible signals on the trellis (i.e., an L1 distance=0), the phase rotators 410, 412, 414 are adjusted to shift the phase in either the first direction or the second direction based on the minimum path metric computed via the trellis structure. Specifically, the phase detector 416, using the trellis, computes a corresponding path metric (i.e., sum of all branch metrics for each phase-shifted signal) for each of the phase-shifted signals $r_k^{-1}$, $r_k^0$, and $r_k^{+1}$ to identify the minimum path metric. For example, when the transient phase error is −0.3 T, the phase-shifted signal $r_k^{-1}$ is determined to have the minimum L1 distance on the trellis. Accordingly the phase rotators 410, 412, 414 will be incremented in the first direction such that the three phase rotators 410, 412, 414 are set to be $\bar{g}(k+[(\hat{\varphi}_k-0.2]\cdot T)$, $\bar{g}(k+[\hat{\varphi}_k-0.1]\cdot T)$, and $\bar{g}(k+[\hat{\varphi}_k]\cdot T)$ respectively. Once again, the phase detector 416 will compute a respective path metric corresponding to the the phase-shifted signal $r_k^{-2}$ ($\bar{g}(k+[\hat{\varphi}_k-0.2]\cdot T)$) to correspond to the minimum L1 distance on the trellis.

Finally, the system will perform another iteration where the phase rotators 410, 412, 414 will be incremented in the first direction again such that the three phase rotators are set to be $\bar{g}(k+[\hat{\varphi}_k-0.3]\cdot T)$, $\bar{g}(k+[\hat{\varphi}_k-0.2]\cdot T)$, and $\bar{g}(k+[\hat{\varphi}_k-0.1]\cdot T)$ respectively. This time, the phase detector 416 will determine the phase-shifted signal $r_k^{-3}$ ($\bar{g}(k+[\hat{\varphi}_k-0.3]\cdot T)$) to match any of all possible signals on the trellis such that $\bar{g}(k)=g(k)*\bar{g}(k)=[1,2,1]$ when g(k)=[1, 1].

As noted above, the phase rotators 410, 412, 414 are configured to increment the amount of phase by which the received signal is adjusted by a predetermined size. Accordingly, there may be instances where the phase-shifted signal generated by the phase rotators does not match the target path on the trellis (e.g., when a transient phase error of 1.5 T is induced and the predetermined size of the increment for the phase rotators is set to be 1.0 T, the system may determine that the path metric for two signals ($r_k^{+1}$ and $r_k^{+2}$) correspond to the minimum value and therefore may select either of the two signals as the phase-corrected signal.

In the embodiment illustrated in FIG. 4, the trellis length is set to 128 T. However, a person skilled in the art will appreciate that this is merely a design choice to reduce the phase detector delay, and that any number of finite samples may be used on the trellis. Additional details of the four-state trellis are described in more detail below with reference to FIG. 6. The sample window advances at the finite step size (e.g., 0.1 T as used in the description below). A person skilled in the art will understand that any suitable step size may be utilized based on computational resources available.

An integrator 418 does low-pass filtering to perform an averaging operation in the estimated phase. Depending on the output from the integrator 418, an interpolator 420 selects the appropriate phase shift $l(\hat{\varphi}_k)$. Specifically, the interpolator 420 is a filter that implements the selected phase shift (correction). Accordingly, the required phase correction can be determined using only three phase rotators 410, 412, 414 instead of the plurality of filters in the sinc filter 304 as discussed in FIG. 3.

Figure 5:
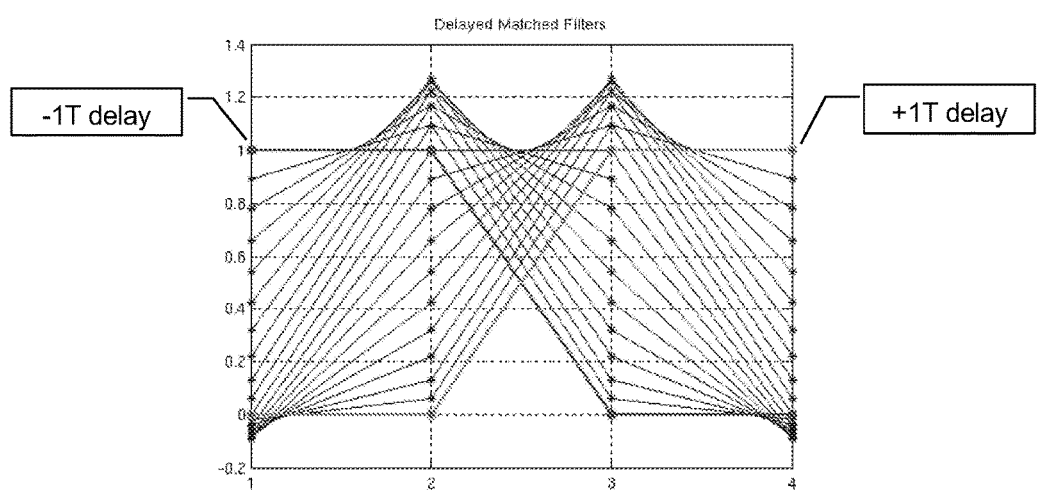
FIG. 5 depicts a graph plotting the taps of twenty-one 4-tap filters against the respective weight.

FIG. 5 depicts a graph plotting the taps of twenty-one 4-tap filters against their respective weight. As illustrated in FIG. 5, the channel response is measured from −1T to +11 and the step size is 10%. As shown in FIG. 5, the x-axis represents the 4 taps, and the y-axis represents a weight of the value of each of those 4 taps. In the example shown in FIG. 5, where the step size is set to be 0.1 T (10%), the phase rotators will continue to cycle in increments of 0.1 until the output of the filters settles at the desired phase.

Figure 6:
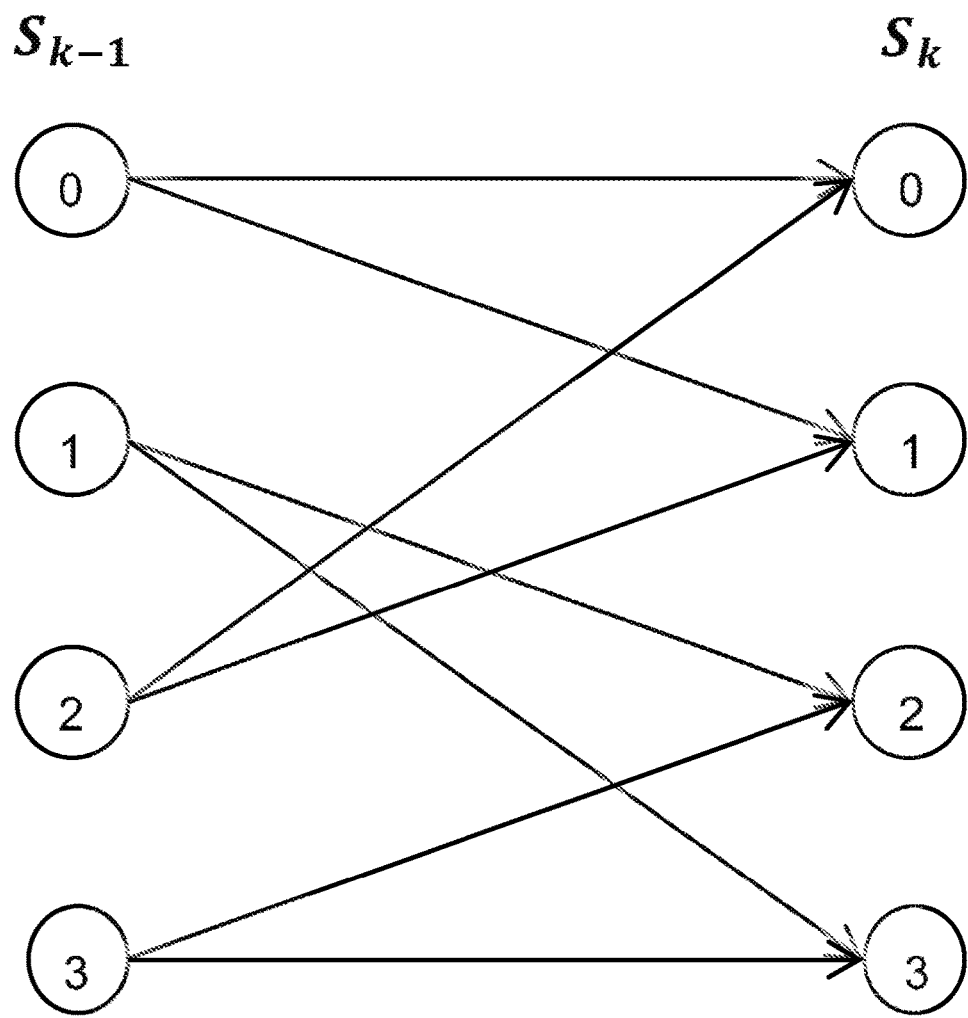
FIG. 6 depicts an example trellis structure in accordance with methods and systems described in this disclosure.

FIG. 6 depicts an example trellis structure. As shown in FIG. 6, only a single trellis is needed because each signal is a 3-dimensional vector. The three outputs from the phase rotators are placed on the trellis. A branch metric is calculated based on the following formulation:

$$B_k = \left\| \begin{bmatrix} r_k^{-1} \\ r_k^{0} \\ r_k^{+1} \end{bmatrix} - I(S_k) \right\|$$

where $I(S_k)$ is the reconstructed true signal. The path metric is calculated by summing the branch metrics based on the following formulation:

$$P_k = \text{Survivors} \left( \begin{bmatrix} \sum_i B_i^{+1} \\ \sum_i B_i^{0} \\ \sum_i B_i^{-1} \end{bmatrix} \right) = \begin{bmatrix} P_k^{-1} \\ P_k^{0} \\ P_k^{+1} \end{bmatrix}$$

As note above, both the branch metric $B_k$ and the path metric $P_k$ are 3-dimensional vectors. The decision $D_k$ is determined based on the following formulation:

$$D_k = \text{argmin}_{\{-1,0,+1\}} \begin{bmatrix} P_k^{-1} \\ P_k^{0} \\ P_k^{+1} \end{bmatrix}$$

where the decision $D_k$ is scalar from $\{-1, 0, +1\}$ representing the winning phase (i.e., the phase correction to be applied). That is, the decision $D_k$ selects the path metric having the minimum value.

Figure 7:
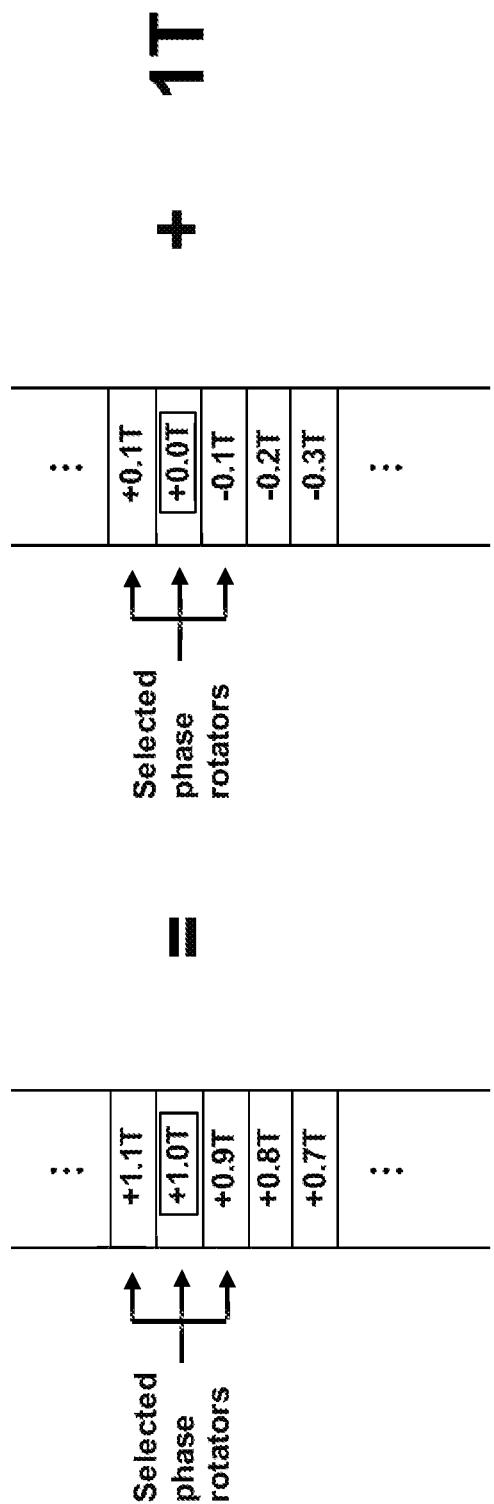
FIG. 7 depicts an additional benefit of implementing phase correction using the phase rotators in accordance with the methods and systems described above to correct cycle slips.

FIG. 7 depicts an additional benefit of implementing phase correction using the phase rotators in accordance with the methods and systems described above to correct cycle slips. If timing error is 0.5 T, for example, conventional timing loop will settle down at −0.5 T or 0.5 T with equal probability. Accordingly, selecting −0.5 T will result in 1 T cycle-slip. In accordance with the system described here, the 1 T cycle-slip as discussed above is avoided. Specifically, the phase rotators evolve in the following manner: (+0.1 T>>+0.2 T>>+0.3 T>>+0.4 T>>+0.5 T) because +0.1 T has offset of 0.4 T which is less than 0.6 T which must be selected if the phase rotator is moving in the other direction. Accordingly, the system will necessarily move towards the desired phase.

Figure 8A:
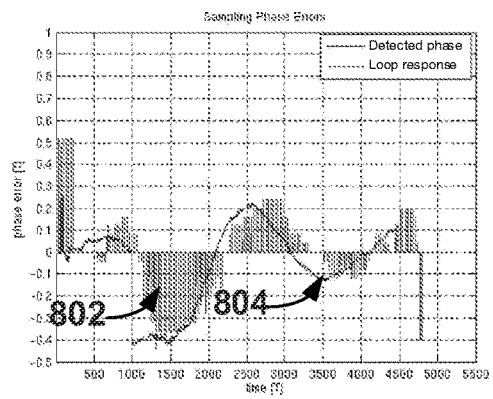
FIGS. 8(a)-8(d) graphically illustrate several waveforms associated with a HAMR laser power variation in accordance with the methods and systems described in this disclosure.
Figure 8B:
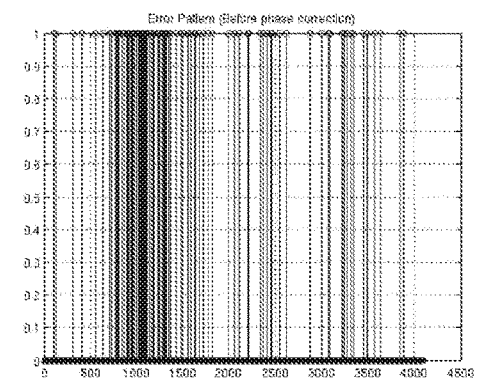
Figure 8C:
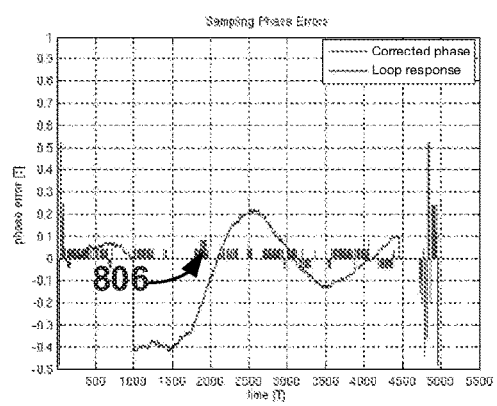
Figure 8D:
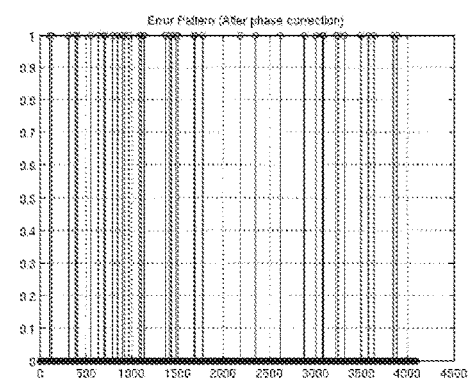

FIGS. 8(a)-8(d) graphically illustrate several waveforms associated with a HAMR laser power variation in accordance with the methods and systems described in this disclosure. FIG. 8(a) graphically represents the detected phase error 802 in combination with the loop response 804 when −0.4 T of phase defect is injected at 1000 T. As shown in FIG. 8(b), without the cancellation of the phase defect, the bit error rate (BER) is determined to be 0.0364. In contrast, FIG. 8(c) graphically represents the corrected phase 806 with minimal phase error such that the BER is reduced to 0.0154 as shown in FIG. 8(d).

Figure 9:
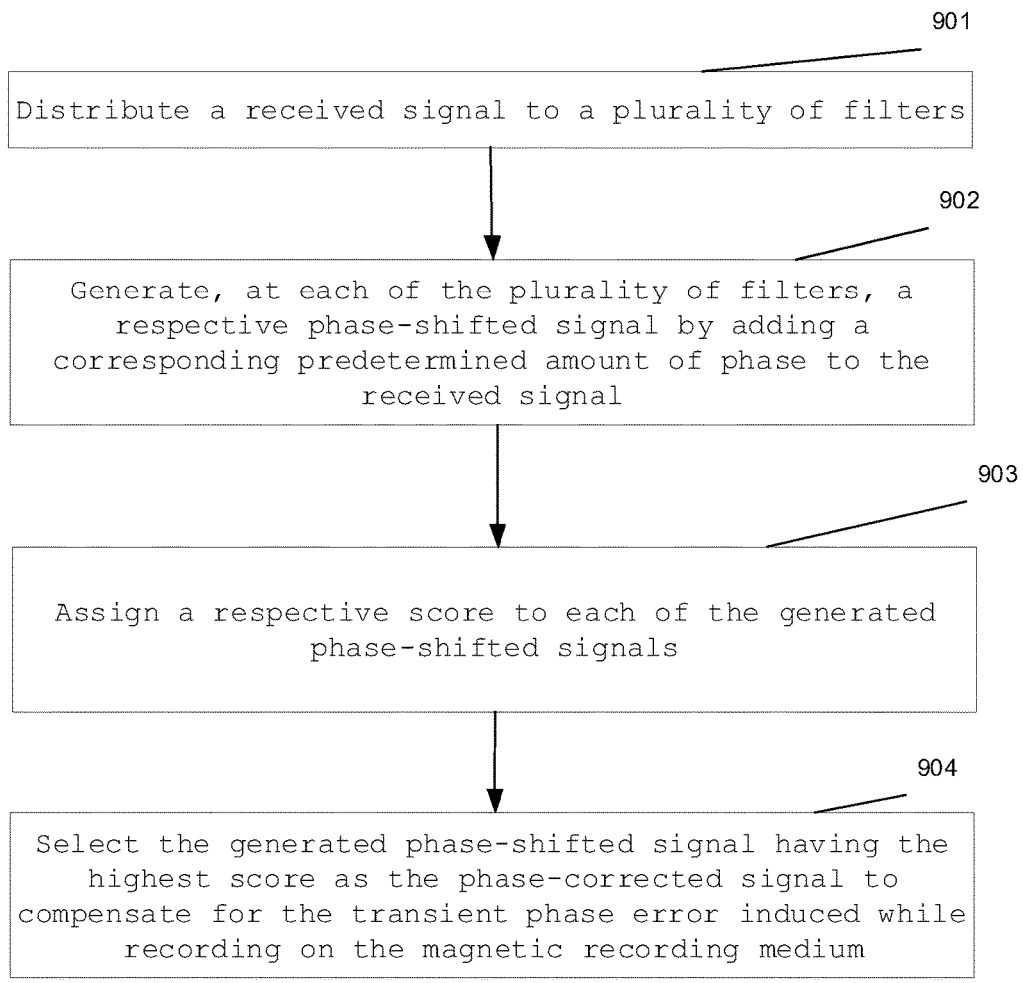
FIG. 9 depicts a flow diagram of a process 900 in accordance with implementations of the subject matter of the present disclosure for correcting a phase defect induced while recording on a magnetic recording medium.

FIG. 9 depicts a flow diagram of a process 900 in accordance with implementations of the subject matter of the present disclosure for correcting a phase defect induced while recording on a magnetic recording medium. Process 900 begins at 901 where the system distributes a received signal to a plurality of filters or phase rotators. As noted above, the received signal may be equalized prior to being distributed to the plurality of filters 304 or phase rotators 410, 412, 414.

Once the filters receive the input signal, then at 902, each filter generates a phase-shifted version of the received signal. Specifically, as noted above, each of the sinc filters increments the amount of phase added to the distributed input signal by a predetermined amount. At 903, a score is assigned to each of the generated phase-shifted signals. For example, a score may be assigned to each of the phase-shifted signals based on a corresponding path metric. At 904, the process selects the generated phase-shifted signal with the highest score (i.e., the phase-shifted signal having the minimum path metric) as the phase-corrected signal which cancels the transient phase defect induced while recording on the magnetic recording medium.

Various embodiments discussed in conjunction with FIGS. 1-9 are performed by various electronic components of one or more electronic circuits, such as but not limited to an integrated circuit, application-specific integrated circuit (ASIC), DSP, and/or the like. Various components discussed throughout this disclosure are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 9 does not necessarily require the particular order shown, or sequential order, to achieve desirable results. In certain implementations, multitasking and parallel processing may be advantageous. Other variations are within the scope of the following claims.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for compensating for a transient phase error induced while recording on a magnetic recording medium, the method comprising:
   receiving an input signal;
   distributing the received signal to a plurality of filters;
   generating, at each of the plurality of filters, a respective phase-shifted signal by adding a corresponding predetermined amount of phase to the received signal;
   assigning a respective score to each of the generated phase-shifted signals; and
   selecting the generated phase-shifted signal having the highest score as the phase-corrected signal to compensate for the transient phase error induced while recording on the magnetic recording medium.

2. The method of claim 1, wherein the assigning a respective score to each of the generated phase-shifted signals comprises:
   computing, for each of the phase-shifted signals generated by the corresponding filter, a respective path metric; and
   assigning the respective score to each of the generated phase-shifted signals based on the corresponding computed path metrics.

3. The method of claim 2, wherein the computing of the respective path metric comprises:
   computing, using a trellis structure and a Viterbi algorithm, a distance between the generated phase-shifted signals output from the corresponding filter and all possible signals on the trellis structure.

4. The method of claim 3, wherein selecting the generated phase-shifted signal having the highest score as the phase-corrected signal comprises:
   selecting, using a multiplexer, the generated phase-shifted signal corresponding to a minimum path metric from the plurality of computed path metrics as the phase-corrected signal.

5. The method of claim 1, wherein the plurality of filters comprises:
   a first filter configured to shift the phase of the received signal by a predetermined amount in a first direction;
   a second filter configured to shift the phase of the received signal by the predetermined amount in a second direction opposite to the first direction; and
   a third filter configured to maintain the phase of the received signal.

6. The method of claim 5, further comprising:
   computing, using a trellis structure, a respective path metric for each of the generated phase-shifted signal.

7. The method of claim 6, further comprising:
   selecting one of the first direction or the second direction based on the identified phase-adjusted signal corresponding to the minimum distance metric; and
   cyclically incrementing the amount of shift in the phase of the received signal in the selected direction in each of the first, the second, and the third filters.

8. The method of claim 7, further comprising:
   computing a path metric for each of the phase-shifted signal generated by the first, the second, and the third filter; and
   selecting a phase-shifted signal corresponding to a minimum path metric from the plurality of computed path metrics as the phase-corrected signal.

9. The method of claim 1, wherein the phase-corrected signal is recorded on the magnetic recording medium using a heat-assisted magnetic recording (HAMR) apparatus, the HAMR apparatus being configured to apply heat to a spot on the magnetic recording medium via a laser.

10. The method according to claim 9, wherein the transient phase error is induced by a laser power variation during a write operation.

11. An apparatus for compensating for a transient phase error induced while recording on a magnetic recording medium, the apparatus comprising:
   control circuitry configured to:
      receive an input signal; and
      distribute the input signal to a plurality of filters;
   a plurality of filters configured to receive the input signal from the control circuitry, the plurality of filters each being configured to generate a respective phase-shifted signal by adding a corresponding predetermined amount of phase to the received signal;
   a phase detector configured to assign a respective score to each of the generated phase-shifted signals; and
   a multiplexer (MUX) configured to select the generated phase-shifted signal having the highest score as the phase-corrected signal to compensate for the transient phase error induced while recording on the magnetic recording medium.

12. The apparatus of claim 11, wherein the phase detector, when assigning a respective score to each of the generated phase-shifted signals, is configured to:
   compute, for each of the phase-shifted signals generated by the corresponding filter, a respective path metric; and
   assign the respective score to each of the generated phase-shifted signals based on the corresponding computed path metrics.

13. The apparatus of claim 12, wherein the phase detector, when computing the respective path metric is configured to:
   compute, using a trellis structure and a Viterbi algorithm, a distance between the generated phase-shifted signals output from the corresponding filter and all possible signals on the trellis structure.

14. The apparatus of claim 13, wherein the MUX, when selecting the generated phase-shifted signal having the highest score as the phase-corrected signal, is configured to:
select the generated phase-shifted signal corresponding to a minimum path metric from the plurality of computed path metrics as the phase-corrected signal.

15. The apparatus of claim 11, wherein the plurality of filters comprises:
a first filter configured to shift the phase of the received signal by a predetermined amount in a first direction;
a second filter configured to shift the phase of the received signal by the predetermined amount in a second direction opposite to the first direction; and
a third filter configured to maintain the phase of the received signal.

16. The apparatus of claim 15, wherein the phase detector is further configured to:
compute, using a trellis structure, a respective path metric for each of the generated phase-shifted signal.

17. The apparatus of claim 16, wherein the phase detector is further configured to:
select one of the first direction or the second direction based on the identified phase-adjusted signal corresponding to the minimum distance metric; and
the plurality of filters is configured to:
cyclically increment the amount of shift in the phase of the received signal in the selected direction in each of the first, the second, and the third filters.

18. The apparatus of claim 17, wherein the phase detector is further configured to:
compute a path metric for each of the phase-shifted signals generated by the first, the second, and the third filter; and
select a phase-shifted signal corresponding to a minimum path metric from the plurality of computed path metrics as the phase-corrected signal.

19. The apparatus of claim 11, wherein the phase-corrected signal is recorded on the magnetic recording medium using a heat-assisted magnetic recording (HAMR) apparatus, the HAMR apparatus being configured to apply heat to a spot on the magnetic recording medium via a laser.

20. The apparatus according to claim 19, wherein the transient phase error is induced by a laser power variation during a write operation.

* * * * *